United States Patent [19]

Sugimoto

[11] Patent Number: 5,228,403
[45] Date of Patent: Jul. 20, 1993

[54] SEWING MACHINE FOR SEWING CONTINUOUS PATTERN CONSISTING OF PLURALITY OF PARTIAL PATTERNS

[75] Inventor: Nami Sugimoto, Nagoya, Japan
[73] Assignee: Brother Kogyo Kabushiki Kaisha, Nagoy, Japan
[21] Appl. No.: 958,747
[22] Filed: Oct. 9, 1992
[30] Foreign Application Priority Data
Nov. 6, 1991 [JP] Japan .................. 3-319951
[51] Int. Cl.$^5$ ................ D05B 21/00; D05C 5/04
[52] U.S. Cl. ................ 112/121.12; 112/273; 112/277; 112/454; 112/103
[58] Field of Search ............ 112/121.12, 103, 453, 112/454, 273, 317, 278, 121.11; 364/470

[56] References Cited

U.S. PATENT DOCUMENTS 4,413,574 11/1983 Hirota et al. ............ 112/121.12
4,834,007 5/1989 Miyazaki et al. ............ 112/121.11
5,029,539 7/1991 Yokoe et al. ............ 112/454 X
5,078,068 1/1992 Hager et al. ............ 112/273 X

FOREIGN PATENT DOCUMENTS

57-25882 2/1982 Japan .
57-25885 2/1982 Japan .

Primary Examiner—Peter Nerbun
Attorney, Agent, or Firm—Oliff & Berridge

[57] ABSTRACT

Stitch data of partial patterns constituting a continuous pattern are stored in a memory in the sewing order with each partial pattern separated from the next. When a trouble occurs, such as a break of the needle thread or the consumption of the bobbin thread, or the user depresses a start/stop switch during sewing of the continuous pattern, the sewing machine is stopped. When the user corrects the trouble and subsequently operates a head search key, sewing is resumed, in response to a starting instruction, from the head of the partial pattern at which the sewing was interrupted.

18 Claims, 10 Drawing Sheets

| ITEM | INSTRUCTIONS |
|---|---|
| S10 | EMBROIDERY PATTERN SELECTING PROCESSING |
| S11 | DISPLAY ALL PARTIAL EMBROIDERIES |
| S12 | STORE HEAD ADDRESSES OF PARTIAL EMBROIDERIES |
| S13 | POINTER P ← ADDRESS Ad |
| S14 | STARTING INSTRUCTED INPUT? |
| S15 | ENERGIZE SEWING MACHINE MOTOR |
| S16 | I ← HEAD ADDRESS DESIGNATED BY P |
| S17 | READ IN EMBROIDERY STITCH DATA DESIGNATED BY POINTER I |
| S18 | STOPPING INSTRUCTION INPUT? |
| S19 | EMBROIDERY SEWING PROCESSING |
| S20 | STOP CODE? |
| S21 | I ← I + 1 |
| S22 | STOP SEWING MACHINE MOTOR |
| S23 | P ← P + 1 |
| S24 | HEAD ADDRESS DESIGNATED BY POINTER P PRESENT? |

SEWING MACHINE FOR SEWING CONTINUOUS PATTERN CONSISTING OF PLURALITY OF PARTIAL PATTERNS

BACKGROUND OF THE INVENTION

1. Field of the Invention

This invention relates to a pattern sewing machine and, more particularly, to a sewing machine which can resume, when a trouble occurs during sewing of a continuous pattern consisting of a plurality of partial patterns, sewing from the head of the partially completed pattern at the point where sewing was interrupted.

2. Description of Related Art

Embroidery sewing machines, as pattern sewing machines manufactured in recent years, include an embroidery frame for removably mounting a workpiece thereon, a driving apparatus for driving the embroidery frame to move in the X and Y directions independently of each other, a controlling apparatus for controlling the driving mechanism in accordance with embroidery stitch data, and a ROM card in which embroidery stitch data of a large number of embroidery patterns are stored. Embroidery stitch data of a selected embroidery pattern are read from the ROM card and the driving mechanism is controlled in accordance with the embroidery stitch data thus read to sew the selected embroidery pattern. Each of the embroidery patterns is normally composed of a plurality of partial embroidery patterns, each of which is sewn in the same color with the same thread. Therefore, in the embroidery data of each embroidery pattern, a sewing order of the plurality of partial embroidery patterns is set in advance.

Figure 11:
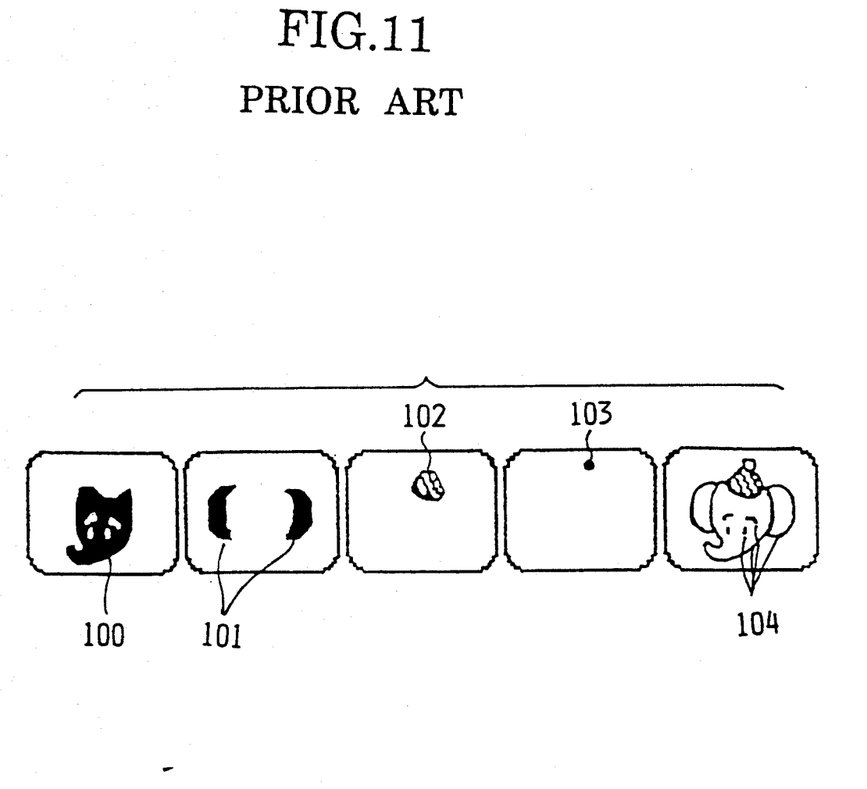
FIG. 11 is a schematic view showing partial embroidery patterns of an embroidery pattern of the prior art.

For example, an embroidery pattern of an elephant caricature, as shown in FIG. 11, is composed of 5 partial embroidery patterns comprising a face part 100, a pair of ears 102, a cap 102, a top portion 103 of the cap and a pair of eyes and eyebrows and a profile line 104. The embroidery stitch data for the embroidery pattern includes data for the parts 100 to 104. The sewing order of the embroidery pattern is such that the partial embroidery patterns 100, 101, 102, 103 and 104 are successively sewn in order from the left to the right as shown in FIG. 11. In the case of an embroidery pattern of a large size, up to 30 to 60 minutes are required for sewing the pattern. If the needle thread is broken during sewing on such an embroidery sewing machine, a thread break detector operates so that the sewing machine is stopped automatically. However, sewing proceeds by 10 stitches or so before the sewing machine is stopped.

A stitch pattern sewing machine is disclosed in U.S. Pat. No. 4,413,574 wherein, when the needle thread is broken and sewing is to be resumed after re-threading of the needle thread, sewing is resumed from the embroidery data at a stitch a predetermined number of stitches (for example, about 100 stitches) prior to the stitch at which the sewing machine was stopped.

In addition, an electronically controlled stitch pattern sewing machine is disclosed in Japanese Patent Application Laid-Open No. Sho 57-25882 wherein, in order to eliminate a pattern selecting operation upon the interruption of sewing, sewing is resumed from the head of the continuous pattern, the sewing of which was interrupted, in response to a one-point signal designating a continuous pattern, a rest signal representative of a rest condition of the sewing machine and a starting instruction signal.

A further stitch pattern sewing machine is also known wherein, when the operator comes aware of an error in the color of the thread or the consumption of the bobbin thread and operates a start/stop switch to stop the sewing machine and later resumes sewing, sewing is either resumed from the embroidery stitch data at a stitch a predetermined number of stitches prior to the stitch at which the sewing was stopped, as described above, or sewing is resumed, in response to operation of a head search key, from the head of the embroidery pattern.

When sewing is to be resumed after interruption of sewing due to a break of the needle thread or the like, it does not substantially matter if sewing is resumed, based on embroidery stitch data, at a stitch that is a predetermined number of stitches prior to the stitch where sewing stopped. However, in such a case wherein consumption of the bobbin thread has been overlooked for a few minutes, incomplete sewing may proceed by 100 stitches or more. In this case, the embroidery pattern cannot be completed even if sewing is resumed based on the embroidery stitch data at the stitch that is the predetermined number of stitches prior to the stitch where sewing stopped.

Accordingly, the head search key must be operated to resume sewing from the head of the embroidery pattern, and consequently, the embroidery pattern portion sewn prior to the interruption is quite wasteful as those stitches must be removed by hand. The loss is particularly serious when sewing is interrupted after sewing of more than one half the embroidery pattern.

Further, also with the stitch pattern sewing machine disclosed in Japanese Patent Application Laid-Open No. Sho 57-25885, when sewing is to be resumed after interruption of pattern sewing, sewing is only resumed from the head of the continuous pattern. Sewing cannot be resumed from the head of one of the partial patterns that constitute the continuous pattern. Also in this instance, sewing is resumed from the head of the continuous pattern in a manner similar to the operation in response to the head search key described above, and consequently, the pattern portion sewn prior to the interruption is quite wasteful.

SUMMARY OF THE INVENTION

It is an object of the invention to provide a sewing machine which can resume, when sewing is interrupted, sewing from the head of a partial pattern which was being sewn at the time of interruption.

According to the invention, a sewing machine comprises stitch forming means for forming stitches on a workpiece, the stitch forming means including a sewing needle movable in upward and downward directions and a needle thread catcher for cooperating with the sewing needle, driving means for driving the stitch forming means, stitch data storage means in which stitch data of a continuous pattern composed of a plurality of partial patterns are stored separately for the partial patterns, controlling means for reading out the stitch data stored in the stitch data storage means and controlling driving of the driving means in accordance with the stitch data thus read, stopping means for stopping the driving means, and supplying means for supplying to the controlling means stitch data at the head of the partial pattern which the controlling means had most recently read from the stitch data storage means prior to when the driving means was stopped by the stopping means.

In the sewing machine, the driving means for driving the stitch forming means is controlled in accordance with stitch data by the controlling means so that a pattern is sewn on a workpiece. The stitch data storage means stores therein stitch data of a continuous pattern, which is composed of a plurality of partial patterns, separately from the partial patterns. When the driving means is stopped by the stopping means, the supplying means supplies to the controlling means stitch data at the head of the partial pattern which the controlling means had most recently read from the stitch data storage means prior to when the driving means was stopped by the stopping means.

When the driving means is stopped, since the supplying means supplies to the controlling means stitch data at the head of the partial pattern which the controlling means had read, sewing can be resumed from the head of the partial pattern which was being sewn at the time of stopping.

Therefore, sewing can be resumed from a partial pattern, which was being sewn at the time of stopping, after the incomplete stitches are removed, and consequently, the loss involved in the interruption of sewing can be minimized and the operating efficiency in sewing can be raised remarkably.

DETAILED DESCRIPTION OF THE PREFERRED EMBODIMENTS

A preferred embodiment of the invention will be described with reference to the drawings.

In the embodiment, the invention is applied to an electronically controlled embroidery sewing machine with a removably mounted embroidery apparatus by which various embroidery pattern stitches can be sewn.

Figure 1:
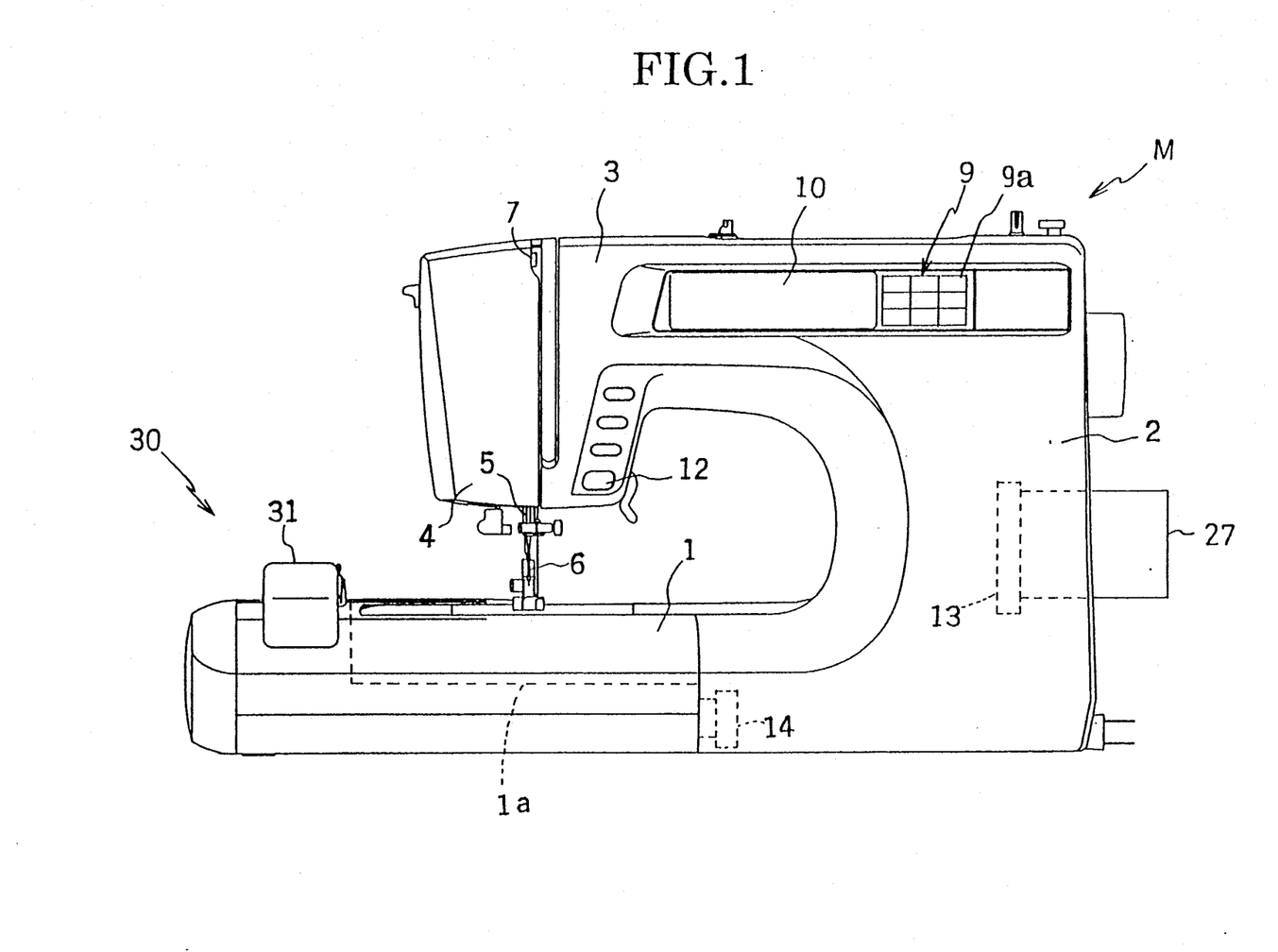
FIG. 1 is a front elevational view of an electronically controlled embroidery sewing machine.

Referring to FIG. 1, an electronically controlled embroidery sewing machine M includes a sewing machine bed 1, a column 2 extending uprightly from a right end portion of the bed 1 and an arm 3 extending leftwardly from the top end of the column 2 (as viewed in the Figure) in an opposing relationship to the bed 1. The bed 1 includes a feed dog vertically moving mechanism (not shown) for moving a feed dog upwardly and downwardly, a feed dog forwardly and backwardly moving mechanism (not shown) for moving the feed dog forwardly and backwardly, and a needle thread catcher (for example, a horizontal cylinder) which accommodates a thread bobbin therein and cooperates with a sewing needle 6. The arm 3 includes a needle bar driving mechanism for moving a needle bar 5, which can mount the sewing needle 6 at the lower end thereof, upwardly and downwardly, a needle bar rocking mechanism for rocking the needle bar 5 in a direction perpendicular to the workpiece feeding direction, and a thread take-up lever driving mechanism (not shown) for moving a thread take-up lever 7 upwardly and downwardly in a timed relationship with the upward and downward movement of the needle bar 5. It is to be noted that the feed dog vertically moving mechanism, the needle bar driving mechanism and the thread take-up lever driving mechanism are driven by a sewing machine motor 17. The feed dog forwardly and backwardly moving mechanism is driven by a feed dog driving stepping motor 19 while the needle bar rocking mechanism is driven by a needle bar rocking stepping motor 18.

A large size liquid crystal display 10 is provided on the front face of the arm 3. Various stitch patterns, such as utility patterns and embroidery patterns, figures and various messages are displayed on the display 10. A total of 30 touch keys 11, formed of transparent electrodes are provided overlaying the front face of the display 10, so as to divide the display into 30 selection zones or points, in a relationship that provides at least one touch key 11 corresponding to each of the plurality of displayed stitch patterns and other display items so that a desired stitch pattern can be selected by depressing an appropriate one of the touch keys 11 corresponding to and overlaying the pattern. A start/stop switch 12 for instructing starting and stopping a sewing operation is provided on the head 4.

A card slot for mounting a ROM card (pattern card) 7 onto a card connector 13 in the inside of the column 2 is formed in the column 2. The ROM card 27 has stored therein embroidery stitch data of a plurality of embroidery patterns for embroidery sewing of various figurative patterns, characters, marks and one point marks. Further, an operation panel 9 is provided on the front face of an upper end portion of the column 2 with nine function keys provided on the operation panel 9. The function keys include a utility sewing key for causing a utility pattern to be displayed, a character sewing key for causing a character pattern to be displayed, a card key for starting embroidery pattern sewing, and a head search key 9a.

A free arm 1a is formed at a left end portion of the bed 1 (as viewed in the FIG.), and an embroidery apparatus 30 is removably mounted on the free arm 1a. An embroidery table 31 is provided on the embroidery apparatus 30 for movement in the Y direction parallel to the workpiece feeding direction (forward and backward direction) and the X direction (leftward and rightward direction) perpendicular to the Y direction. An embroidery frame (not shown) for removably mounting a workpiece thereon is removably mounted on the embroidery table 31.

A first stepping motor 32 (refer to FIG. 2) for feeding the embroidery table 31 in the X direction and a second stepping motor 33 (refer to FIG. 2) for moving the embroidery table 31 in the Y direction are disposed in the body frame of the embroidery apparatus 30. Accordingly, various embroidery patterns can be formed on a workpiece mounted on the embroidery frame by cooperation between the driving movements of the stepping motors 32 and 33, and upward and downward movement of the needle bar 5, in response to driving signals supplied to them from the sewing machine M by way of a connector 14.

Figure 2:
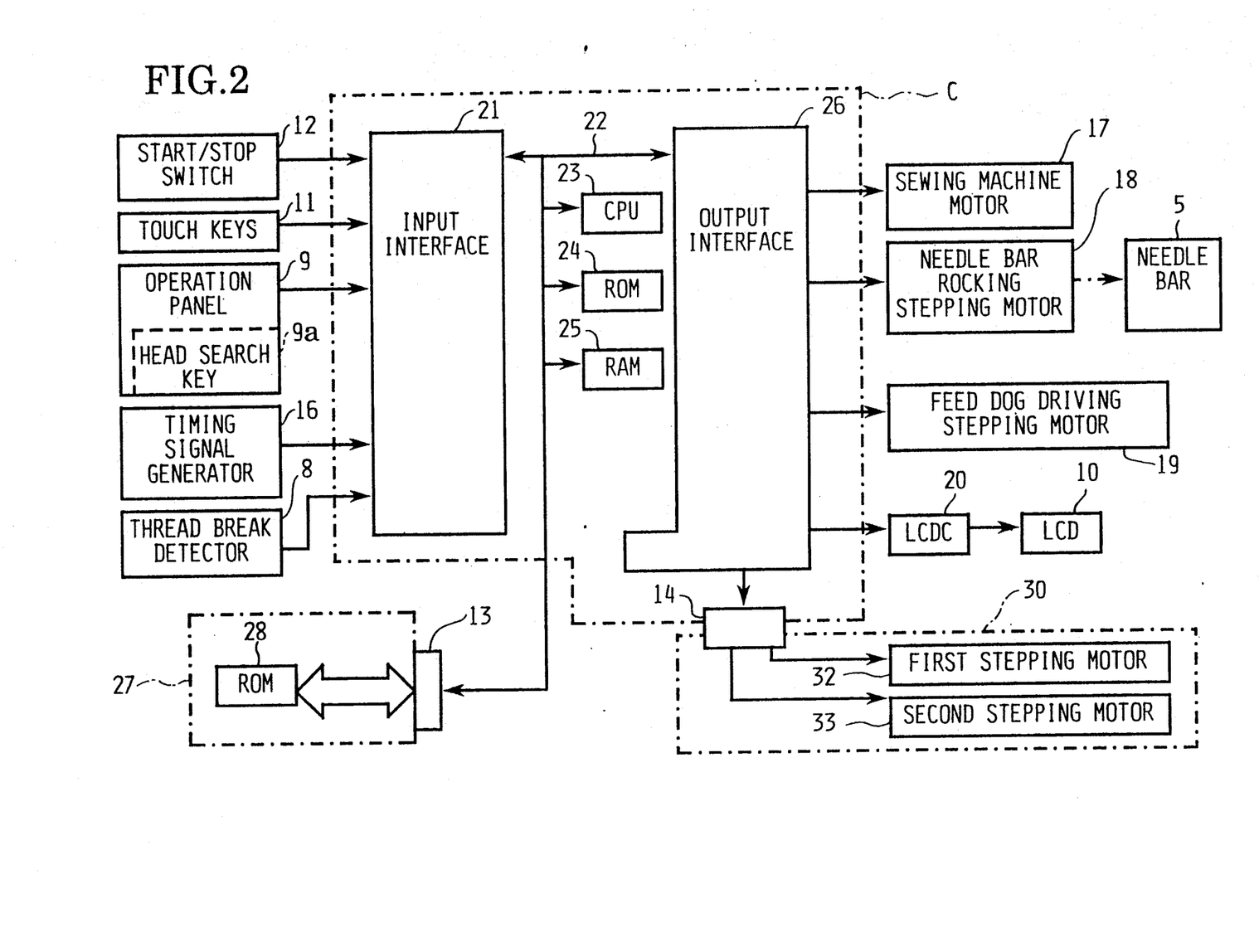
FIG. 2 is a block diagram of a controlling system of the embroidery sewing machine.

The controlling system of the sewing machine M will be described with reference to FIG. 2.

The start/stop switch 12, the touch keys 11, the operation panel 9, a timing signal generator 16 and a thread break detector 8 are connected to an input interface 21 of a controlling apparatus C. The head search key 9a, on the operation panel 9, is operated when embroidery sewing is to be resumed after the interruption of embroidery sewing. The thread break detector 8 detects breaking of the needle thread or consumption of the bobbin thread. The sewing machine motor 17, the needle bar rocking stepping motor 18, the feed dog driving stepping motor 19 and a display controller (LCDC) 20 for the display (LCD) 10 are connected to an output interface 26 of the controlling apparatus C. Further, the first and second stepping motors 32 and 33 of the embroidery apparatus 30 are connected to the output interface 26 by way of the connector 14.

The controlling apparatus C includes a CPU 23, the input interface 21, the output interface 26, a ROM 24 and a RAM 25 all connected to the CPU 23 by way of a bus 22, such as a data bus. A ROM 28 of the ROM card 27, described above, is connected to the bus 22 by way of a connector 13.

Figure 6:
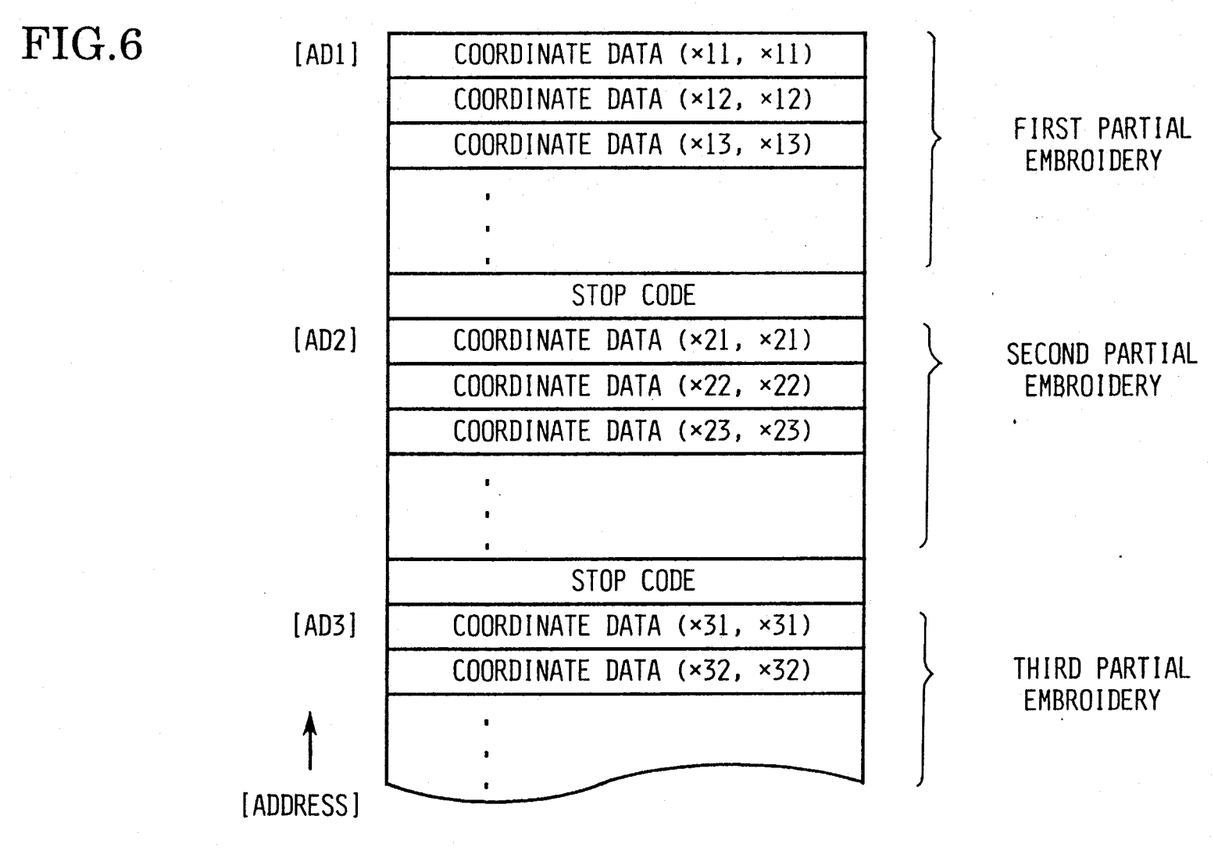
FIG. 6 is a diagrammatic view illustrating the configuration of embroidery stitch data in a ROM card.

Embroidery stitch data of the plurality of embroidery patterns described above are stored in the ROM 28 of the ROM card 27 in a corresponding relationship to pattern code numbers for different kinds of patterns. Each of the embroidery patterns is composed of a plurality of partial embroidery patterns. Embroidery stitch data of each of the embroidery patterns are stored in a manner such as illustrated in FIG. 6, wherein they are arranged in the predetermined order of a first partial embroidery pattern, a second partial embroidery pattern, a third partial embroidery pattern and so on. The embroidery stitch data of each partial embroidery pattern is composed of a plurality of coordinate data representative of positions to which the embroidery frame is to be successively moved and a stop code designating the end of the partial embroidery pattern.

The ROM 24 has stored therein a driving controlling program for driving the motors 17 to 19, a display controlling program for causing the display 10 to display various display items, a control program for embroidery sewing control for controlling the first and second stepping motors 32 and 33 in accordance with the embroidery stitch data, and another control program for partial embroidery pattern designating control, which will be hereinafter described, incidental to the control program for embroidery sewing control and peculiar to the invention. However, since the controls, except the partial embroidery pattern designating control which is peculiar to the invention, are conventional controls, description of them is omitted. The RAM 25 has pointers, counters, buffers and so forth for temporarily storing results of calculations by the CPU 23.

Subsequently, the partial embroidery pattern designating control which is executed by the controlling apparatus C of the sewing machine M will be described.

Figure 3:
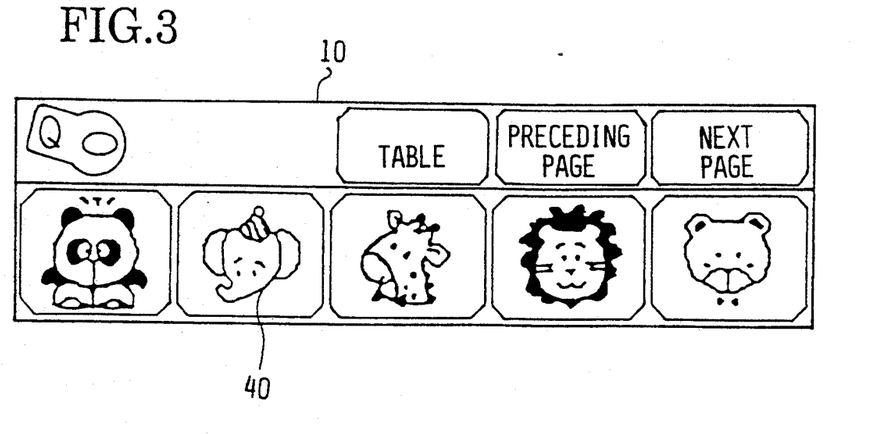
FIG. 3 is a schematic view showing an exemplary display when an embroidery pattern is to be selected.
Figure 4:
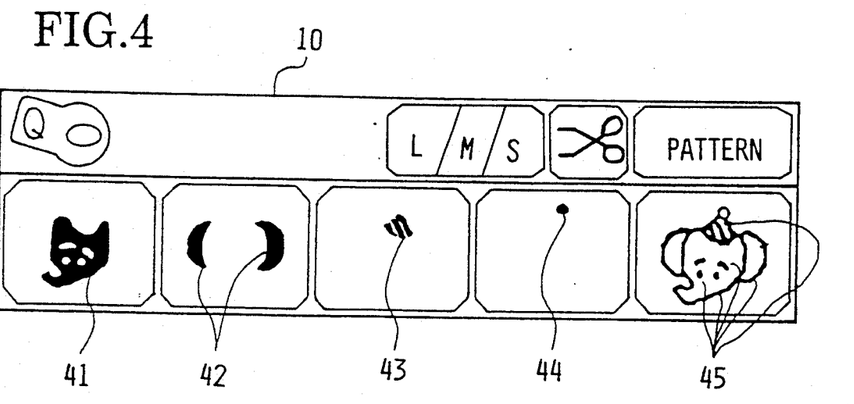
FIG. 4 is a similar view but showing an exemplary display of a plurality of partial embroidery patterns of a selected embroidery pattern.

Prior to executing control, the sewing machine M must receive power, i.e., be turned on. Then the card key of the operation panel 9 will be operated after a ROM card 27, containing embroidery stitch data of a large number of embroidery patterns, is set in position. Consequently, the first five embroidery patterns are displayed on the display 10 as shown in FIG. 3. The displayed contents of the display 10 may be changed by manual operation of one of the appropriate ones of the touch keys 11 overlaying the indications of "PRECEDING PAGE" or "NEXT PAGE". When a desired embroidery pattern is displayed, at least one of the appropriate touch keys 11 overlaying the indication of the desired embroidery pattern will be manually to select the embroidery pattern. Thus, if it is assumed that, for example, an embroidery pattern 40 representing an elephant is selected in the displayed condition of FIG. 3, then the five partial embroidery patterns that comprise the embroidery pattern 40, that is, a face 41, ears 42, a cap 43, a top portion 44 of the cap and eyes, eyebrows and profile lines 45, are displayed on the display 10 as shown in FIG. 4.

There may be more than the five partial embroidery patterns of this example. In that case a display similar to FIG. 3 is provided allowing the operator to go to the next page of partial embroidery patterns or return to the preceding page if at a partial embroidery pattern greater than five. The number of partial embroidery patterns may also be less than five.

Subsequently, the start/stop switch 12 will be operated after a needle thread of the same color as the first partial embroidery pattern (face 41) is threaded. In response to such operation, embroidery sewing of the first partial embroidery pattern is started on the embroidery sewing machine M. When the embroidery sewing is completed, the embroidery sewing machine M is stopped in response to the stop code and the needle thread will be changed to that required for the next partial pattern. After that, embroidery sewing will be performed successively for the second and subsequent partial embroidery patterns in the same way.

Figure 5:
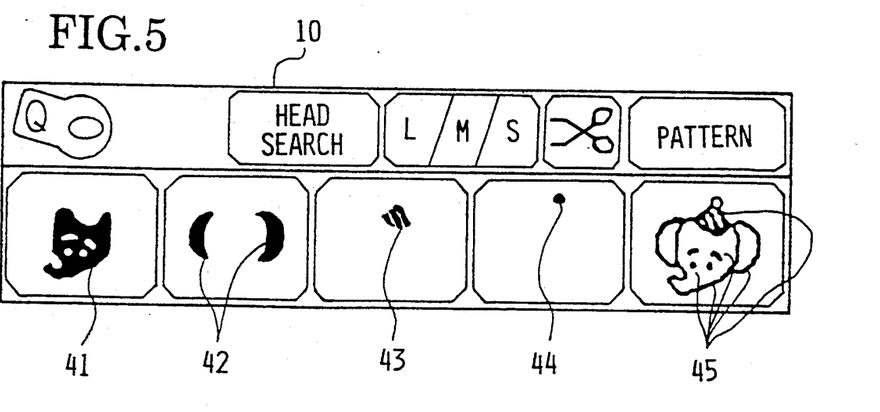
FIG. 5 is a similar view but showing an exemplary display of a plurality of partial embroidery patterns when a head search key is operated.

Here, in the case of trouble, such as a breakage of the needle or the thread or consumption of the bobbin thread, taking place during the embroidery sewing such that the embroidery sewing is interrupted, the head search key 9a will be operated. Consequently, all of the partial embroidery patterns of the embroidery pattern being sewn and the indication of "HEAD SEARCH" are displayed on the display 10 as shown in FIG. 5. In this condition, the touch key for indicating the partial embroidery pattern, for which embroidery sewing should be performed again, will be operated to designate the desired partial embroidery pattern so that the embroidery sewing may be resumed from the head of the desired partial embroidery pattern.

Figure 8A:
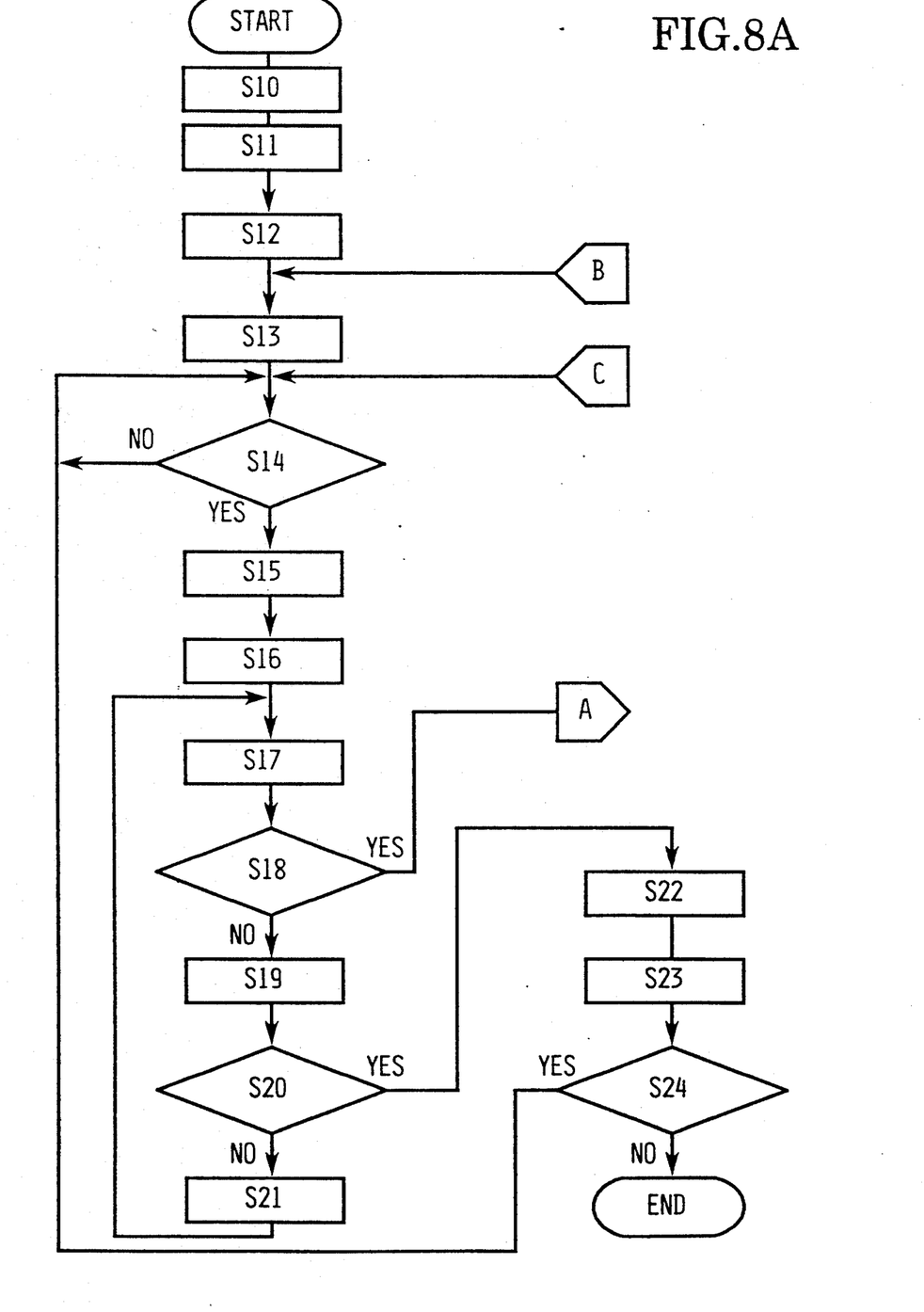
FIG. 8A is a flow chart illustrating part of a routine for partial embroidery pattern designating control.
Figure 8B:
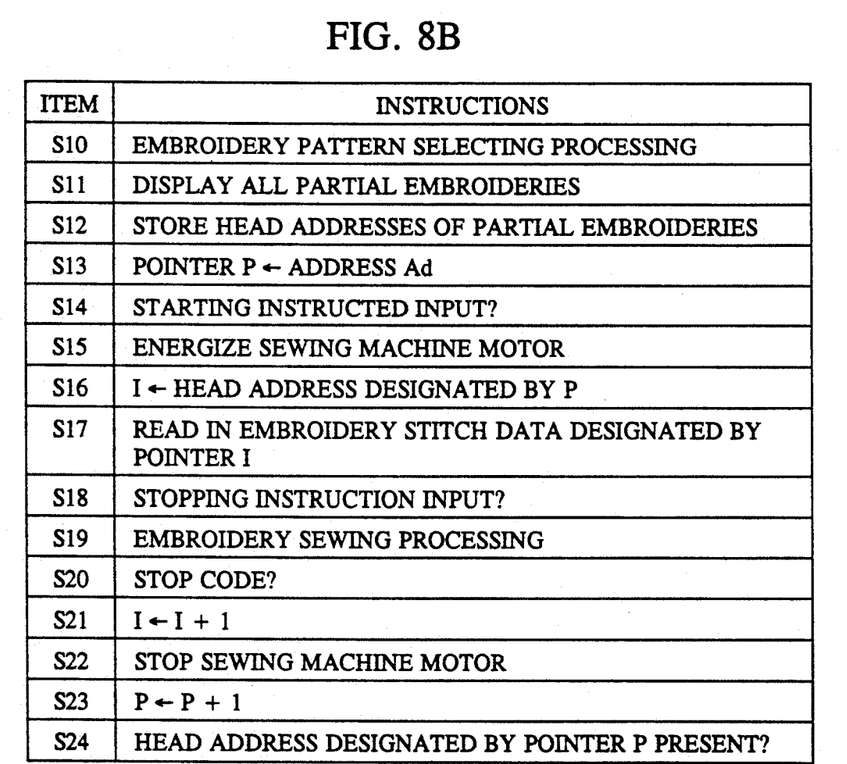
FIG. 8B is table of labels for the flowchart of FIG. 8A.
Figure 9:
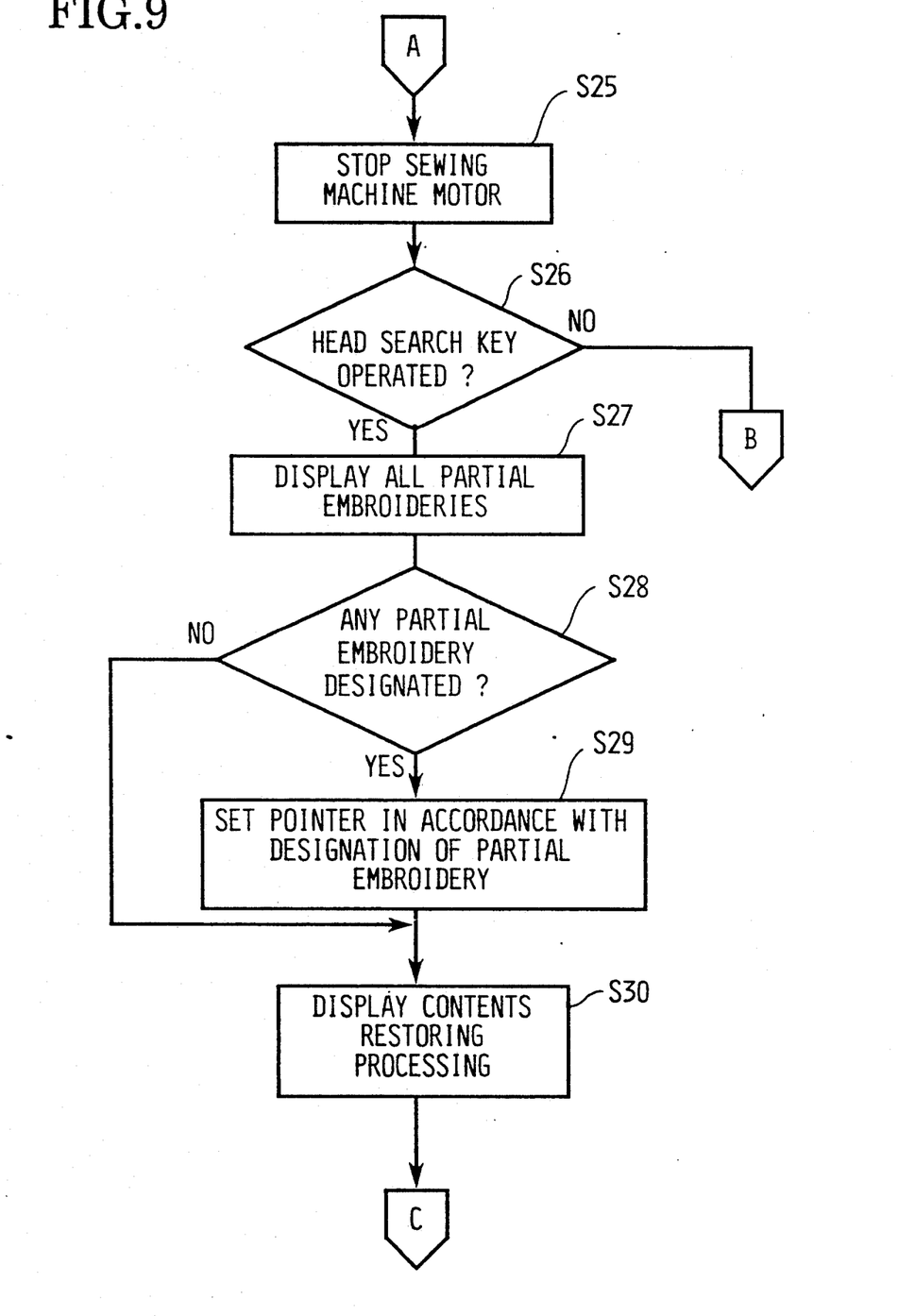
FIG. 9 is a flow chart illustrating the remaining part of the routine for partial embroidery pattern designating control.

The routine for partial embroidery pattern designating control mentioned above will be described with reference to the flow charts of FIGS. 8 and 9. It is to be noted that reference characters Si (i=10, 11, 12, ...) in FIGS. 8 and 9 denote each step.

Figure 7:
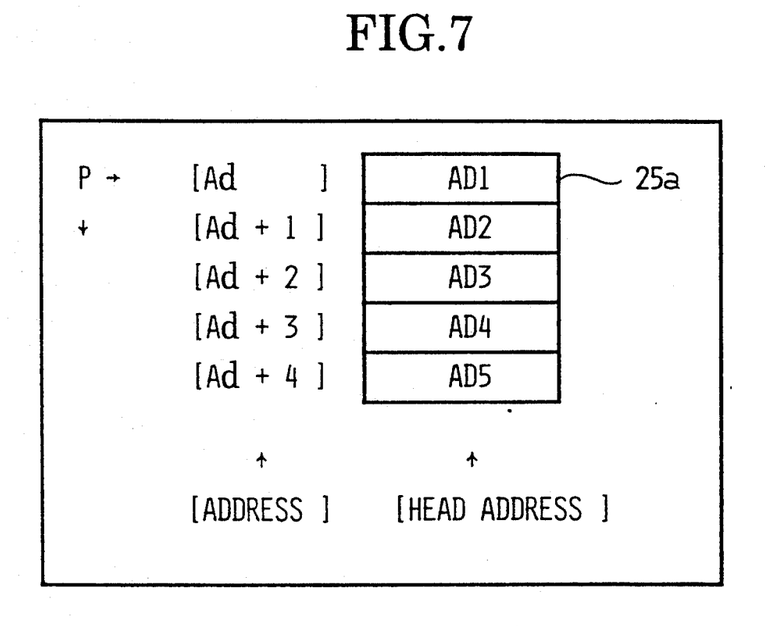
FIG. 7 is a diagrammatic view illustrating a head address memory of a RAM.

As shown FIG. 7, a head address memory 25a, a pointer P specifying an address of the memory 25a and another pointer I specifying an address of embroidery stitch data of the ROM card 27, are provided in the RAM 25. The controlling operation is started, in response to operation of the card key of the operation panel 9, with the process of selecting an embroidery pattern (S10). After selection, all of the partial embroidery patterns of the selected embroidery pattern are displayed on the display 10 (S11). Subsequently, head addresses of all of the partial embroidery patterns are read from the embroidery data of the selected embroidery pattern in the embroidery stitch data of the ROM card 27 and are stored into the head address memory 25a (S12). Next, an address Ad (first address of the memory 25a, FIG. 7) is placed into the pointer P (S13).

Subsequently, when the start/stop switch 12 is operated (S14, Yes), the sewing machine motor 17 is energized (S15) and a head address (first, AD1) indicated by the pointer P is placed into the pointer I (S16). Then, when a stopping instruction has not been input from the start/stop switch 12 (S18, No), the first and second stepping motors 32 and 33 are controlled in accordance with the embroidery stitch data read in at step S17 to perform embroidery sewing processing (S19). If the embroidery stitch data are not the stop code (S20, No), the pointer I is incremented by one (S21), whereafter the control sequence returns to step S17 so that the steps S17 to S21 are repeated. Embroidery sewing proceeds successively in this manner. Embroidery sewing of the first partial embroidery pattern comes to an end when the stop code is read (S20, Yes) and the control sequence advances from step S20 to step S22, at which time the sewing machine motor 17 is stopped and the pointer P is incremented by one (S23).

Subsequently at step S24, it is judged whether or not there is a next head address (such as AD1 to AD5 in the example being described) indicated by the pointer P. Before embroidery sewing of all of the partial embroidery patterns is completed, the judgment at step S24 is Yes and, consequently, the control sequence advances from step S24 to step S14 so that the operations beginning with step S14 are repeated. In this instance, since the pointer P is incremented by one and now indicates the new address (Ad+1, FIG. 7) of the memory 25a, embroidery sewing of the second partial embroidery pattern is performed in the same manner as described above.

The sequence of operations is repeated until embroidery sewing of all of the partial embroidery patterns is completed. At that time, the judgment at step S24 is changed to No and, consequently, the control sequence comes to an end. It is to be noted that, while a display, as shown in FIG. 4, is displayed on the display 10 during embroidery sewing, the partial embroidery patterns beginning with the first partial embroidery pattern may scroll so that the partial embroidery pattern being sewn may be positioned at the leftmost position among them.

When a trouble occurs, such as breaking of the needle thread or consumption of the bobbin thread, a stopping instruction will be input from the thread break detector. Also an interruption could result from operating the start/stop switch 12. In such a case, the judgment at step S18 is Yes and the control sequence advances from step S18 to S25, where the sewing machine motor 17 is stopped (FIG. 9). While stopped, the operator corrects the cause of the trouble, removes the incomplete embroidery stitches and then manually operates the head search key 9a (S26, Yes). At that time, a set of five partial embroidery patterns, including the partial embroidery pattern being sown, of the selected embroidery pattern are displayed on the display 10 (in our example, all of the five partial embroidery patterns) and the message of "HEAD SEARCH" is displayed at the top stage of the display 10 as shown in FIG. 5 (S27). It is to be noted that data for the display are stored in the display control program.

Subsequently, in order to designate the desired partial embroidery pattern for which embroidery sewing is to be tried again, the operator will operate an appropriate one of the touch keys 11 overlaying the desired partial embroidery pattern (S28, Yes). Consequently, the pointer P is set in response to the designation of the partial embroidery pattern (S29).

In this instance, if, for example, the third partial embroidery pattern is designated, then Ad+2 is placed into the pointer P. Then, processing to restore the displayed contents is executed (S30), whereafter the control sequence returns to step S14. Here, in case no partial embroidery pattern is designated after operation of the head search key 9a, the judgment at step S28 is No, and the control sequence advances to step S30. In this case, the pointer P is not changed and accordingly remains indicating the address of the partial embroidery pattern at which sewing was interrupted. For example, when sewing is interrupted during sewing of the third partial embroidery pattern, the pointer P will be maintained at Ad+2.

Further, when the head search key 9a is not operated after stopping of the sewing machine motor 17 at step S25, the judgment at step S26 is No, and consequently, the control sequence advances to step S13 where the pointer P is set to the address Ad. In short, embroidery embroidery sewing will be resumed from the head of the selected embroidery pattern (i.e., from the head of the first partial embroidery pattern).

The pointer P and the memory 25a make it possible, when embroidery sewing is interrupted, to designate the head address of the first partial embroidery pattern of an embroidery pattern in the case where the head search key 9a is not operated, to designate the head address of a partial embroidery pattern at which sewing was interrupted in the case where the head search key 9a is operated but no partial embroidery pattern is designated subsequently, and to designate the head address of a desired partial embroidery pattern from which sewing is to be resumed in case where the head search key 9a is operated first and then the touch key 11 at the indication of a desired one of the partial embroidery patterns displayed on the display 10 is operated, for embroidery sewing to be resumed from a desired partial embroidery pattern when sewing is interrupted, and consequently, when embroidery sewing is interrupted, the operator need only remove the stitches of the incompletely sewn partial embroidery pattern and then resume embroidery sewing from that partial embroidery pattern.

Consequently, the loss of time, upon interruption of embroidery sewing, and the operational efficiency can be increased remarkably. This is particularly true since the touch key 11, at the indication of any one of partial embroidery patterns displayed on the display 10 can be operated to designate a desired partial embroidery pattern thereby simplifying designation of a partial embroidery pattern.

A modification to steps S25 to S30, described above, will be described with reference to FIG. 10. In the modified control, the sewing machine motor 17 is stopped in response to an input of a stopping instruction (S40). Then, the number N of times the head search key 9a is operated by the operator is counted (S41), whereafter the pointer P is set to P-(N−1). At that time, the control sequence returns to step S14.

Figure 10:
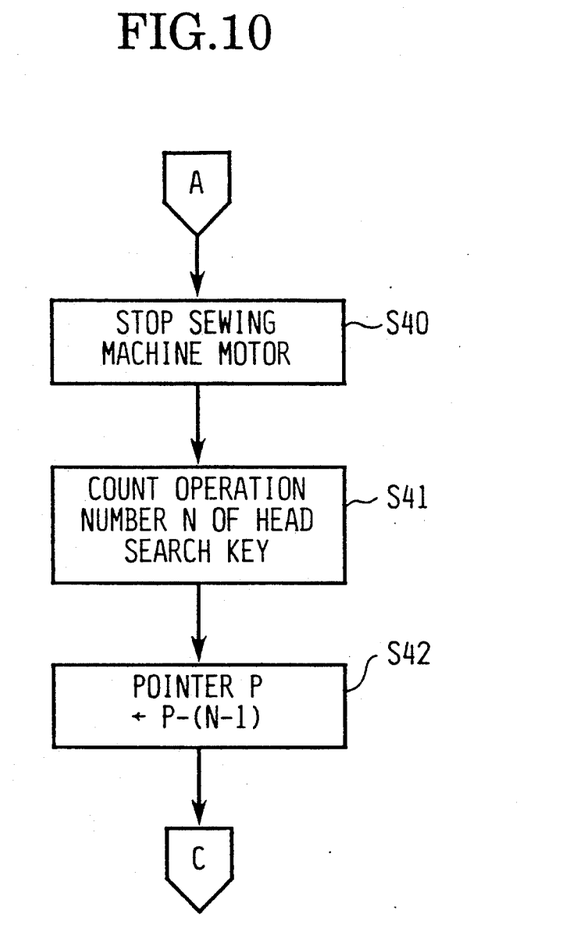
FIG. 10 is a flow chart similar to FIG. 9 but illustrating a modification to the part of the routine shown in FIG. 9.

In short, the head address of the partial embroidery pattern at which embroidery sewing was interrupted can be indicated by operating the head search key 9a once or the head address of a partial embroidery pattern, N−1 partial embroidery patterns prior to the partial embroidery pattern interrupted, can be designated by operating the head search key 9a N times. It is to be noted that the pointer P changes cyclically within the range from Ad to Ad+4 (of our example) and the displayed contents on the display 10 are changed so that the partial embroidery pattern indicated by the pointer P may be positioned at the leftmost position in the same manner as during embroidery sewing previously discussed.

In this manner, by operating the head search key 9a once or a plurality of times, the head address of a desired partial embroidery pattern can be designated by means of the pointer P and the memory 25a, and embroidery sewing can be resumed from the head of the designated partial embroidery pattern. It is to be noted that, where ten keys are provided in addition to the head search key 9a, a desired partial embroidery pattern from which embroidery sewing is to be resumed may be designated by designating the number (1, 2, . . . , 5) of the desired partial embroidery pattern by means of the ten keys after operation of the head search key 9a.

Also, although the sewing machine of the embodiment is described above wherein embroidery stitch data of embroidery patterns are stored in a ROM card, such embroidery data may be stored other than in the ROM 24 of the controlling apparatus C or another ROM. Further, the display 10 may be a color display on which partial embroidery patterns are displayed in the colors designated for the individual partial embroidery patterns.

Further, while the embroidery patterns formed on an embroidery sewing machine provided with the embroidery apparatus 30 are described as an example of pattern stitches, the present invention can be applied to a zigzag sewing machine which is not provided with such an embroidery apparatus 30 but forms a pattern stitch by changing the relative positions of the sewing needle 6 and the workpiece. In the invention, a pattern is defined to include an embroidery pattern formed by an embroidery sewing machine and another pattern formed by a zigzag sewing machine.

It is to be noted that the partial embroidery pattern designating control in the embodiment described above is illustrated as a mere example. Many changes and modifications can be made to the embodiment described above without departing from the spirit and scope of the invention as set forth herein.

What is claimed is:

1. A sewing machine comprising:
    stitch forming means for forming stitches on a workpiece;
    driving means for driving said stitch forming means;
    stitch data storage means for storing stitch data of a continuous pattern including a plurality of partial patterns, each of the partial patterns having starting stitch data which is related to a first stitch of each of the partial patterns;
    controlling means for reading the stitch data stored in said stitch data storage means and controlling said driving means based on the stitch data read;
    stopping means for stopping said driving means; and
    supplying means for supplying to said controlling means the starting stitch data of the partial pattern which said controlling means read from said stitch data storage means when said driving means was stopped by said stopping means, a designated partial pattern of the plurality of partial patterns, and a first partial pattern of the continuous pattern.

2. The sewing machine as claimed in claim 1, wherein the stitch data of each of the partial patterns stored in said stitch data storage means includes a plurality of coordinate data indicative of relative positions of said sewing needle and the workpiece and end data indicative of an end of the partial pattern, the stitch data of the continuous patterns comprising stitch data of a plurality of partial patterns.

3. The sewing machine of claimed in claim 1, further comprising designating means for selectively designating a one of the plurality of partial patterns, wherein said supplying means commences supplying stitch data of the partial pattern designated by said designating means and subsequently provides stitch data of following partial patterns in sequence to said controlling means.

4. The sewing machine as claimed in claim 1, further comprising detecting means for detecting a break of a needle thread, wherein said stopping means stops said driving means when said detecting means detects the break of the needle thread.

5. The sewing machine as claimed in claim 1, further comprising:
    an embroidery frame for removably holding a workpiece thereon; and
    moving means for driving said embroidery frame to move in perpendicular X and Y directions, wherein the stitch data of the partial patterns stored in said stitch data storage means includes embroidery data of an embroidery pattern which has a plurality of partial embroidery patterns and each of the embroidery data of the partial embroidery patterns include a plurality of coordinate data indicative of positions to which said embroidery frame is to be successively moved and end data indicative of an end of the partial embroidery pattern.

6. A sewing machine comprising:
    stitch forming means for forming stitches on a workpiece;
    driving means for driving said stitch forming means;
    stitch data storage means for storing stitch data of a continuous pattern including a plurality of partial patterns, each of the partial patterns having a starting stitch data which is related to a first stitch of each of the partial patterns;
    controlling means for reading the stitch data stored in said stitch data storage means and controlling said driving means based on the stitch data which is read out;
    stopping means for stopping said driving means; and
    pattern identifying means for identifying among the plurality of partial patterns at least one partial pattern;
    supplying means for supplying to said controlling means the starting stitch data of said at least one partial pattern identified by said pattern identifying means.

7. The sewing machine as claimed in claim 6, wherein the stitch data of each of the partial patterns stored in said stitch data storage means includes a plurality of coordinate data indicative of relative positions of said sewing needle and the workpiece and end data indicative of an end of the partial pattern, wherein the stitch data of the continuous patterns are composed of stitch data of a plurality of partial patterns.

8. The sewing machine as claimed in claim 6, further comprising display means for displaying a plurality of partial patterns thereon, wherein said display means displays a plurality of partial patterns thereon when said stopping means stops said driving means.

9. The sewing machine as claimed in claim 8, further comprising designating means for designating, by way of the plurality of partial patterns displayed on said display means, an arbitrary one of the partial patterns, wherein said supply means reads starting stitch data of a partial pattern designated by said designating means and supplies the stitch data thus read to said controlling means.

10. The sewing machine as claimed in claim 9, wherein said display means is capable of displaying thereon a plurality of figures representative of the partial patterns, and said designating means includes touch keys formed of transparent electrodes individually corresponding to the plurality of figures.

11. The sewing machine as claimed in claim 6, wherein said stopping means includes a stop switch for instructing stopping of sewing.

12. The sewing machine according to claim 11, further comprising a designating means, wherein said display means has a plurality of display areas in each of which a partial pattern is displayed, the partial patterns displayed in said display means being changed over in accordance with a partial pattern designated by said designating means.

13. The sewing machine as claimed in claim 6, further comprising:
an embroidery frame for removably holding a workpiece thereon; and
moving means for driving said embroidery frame to move in the perpendicular X and Y directions, wherein the stitch data of the partial patterns stored in said stitch data storage means include embroidery data of a plurality of partial embroidery patterns constituting the embroidery pattern and each of the embroidery data of the partial embroidery patterns is composed of a plurality of coordinate data indicative of positions to which said embroidery frame is to be successively moved and end data indicative of an end of the partial embroidery pattern.

14. A sewing machine, comprising:
a sewing needle movable in upward and downward directions;
workpiece moving means for moving a workpiece;
a motor for changing the relative positions of said sewing needle and said workpiece moving means;
a memory in which stitch data, of a continuous pattern including a plurality of partial patterns, each of the partial patterns having a plurality of coordinate data indicative of relative positions of said sewing needle and said workpiece moving means and end data indicative of an end of a partial pattern, are stored, in a predetermined order, separately for individual partial patterns of the continuous pattern;
a first pointer for storing therein a position of said memory at which stitch data of the head of a partial pattern being sewn are stored;
controlling means for controlling driving of said motor in accordance with the stitch data stored in said memory;
stopping means for stopping said motor;
a re-activating key for sending out, when depressed after said motor is stopped by said stopping means, a signal to said controlling means to re-active said motor; and
supplying means for reading out, when said re-activating key is depressed, stitch data of the partial pattern from the position of said memory designated by said first pointer commencing with a starting stitch data and supplying the stitch data to said controlling means.

15. The sewing machine as claimed in claim 14, further comprising a display having a plurality of display areas and capable of displaying figures of a plurality of partial patterns in said display areas thereof, a plurality of touch keys individually corresponding to said display areas of said display, and a second pointer is changed to store therein a position of said memory at which one of the partial patterns which corresponds to a depressed one of said touch keys, wherein said supplying means reads out, when one of said touch keys is depressed, stitch data of the corresponding partial pattern from the position of said memory designated by said second pointer commencing with starting stitch data and supplies the stitch data to said controlling means.

16. The sewing machine as claimed in claim 14, wherein said stopping means includes a thread break detector for detecting a break of a needle thread.

17. The sewing machine as claimed in claim 14, further comprising a display capable of displaying figures of a plurality of partial patterns thereon, a counter for counting a number of times by which said re-activating key is operated, and a second pointer is changed to store therein a position of said memory at which stitch data of the head of a partial pattern corresponding to the value of said counter, wherein said supplying means reads out stitch data of the partial pattern from the position of said memory designated by said second pointer commencing with starting stitch data and supplies the stitch data to said controlling means.

18. The sewing machine as claimed in claim 14, further comprising an embroidery frame to removably holding a workpiece thereon, and moving means for driving said embroidery frame to move in perpendicular X and Y directions, wherein the stitch data of the partial patterns stored in said stitch data storage means include embroidery data of a plurality of partial embroidery patterns constituting an embroidery pattern and each of the embroidery data of the partial embroidery patterns is composed of a plurality of coordinate data indicative of positions to which said embroidery frame is to be successively moved and end data indicative of an end of the partial embroidery pattern.

* * * * *